United States Patent [19]
> Birnbach et al.

[11] Patent Number: 4,710,939
[45] Date of Patent: Dec. 1, 1987

[54] X-RAY FREQUENCY DOWN CONVERTER

[75] Inventors: Curtis Birnbach, Bronx; Jay Tanner, Nesconset, both of N.Y.

[73] Assignee: Quantum Diagnostics Ltd., Hauppauge, N.Y.

[21] Appl. No.: 14,076

[22] Filed: Feb. 3, 1987

Related U.S. Application Data

[63] Continuation of Ser. No. 518,689, Jul. 23, 1983, abandoned.

[51] Int. Cl.⁴ .............................. H01S 3/00; H01S 3/05
[52] U.S. Cl. ........................................ 372/73; 307/425; 372/57; 372/92
[58] Field of Search ............... 307/425; 372/70, 72, 372/73, 57, 5, 55, 92, 69, 705, 109, 74; 250/484.1, 493.1, 327.2, 336.1

[56] References Cited

U.S. PATENT DOCUMENTS

| | | | |
|---|---|---|---|
| 3,772,608 | 11/1973 | Gleason | 372/86 |
| 3,842,284 | 10/1974 | Berta et al. | 250/493.1 |
| 3,914,618 | 10/1975 | Harris | 307/425 |
| 3,975,637 | 8/1976 | Ikedo et al. | 250/327.2 |
| 3,986,139 | 10/1976 | Meneely et al. | 372/83 |
| 4,002,922 | 1/1977 | Young | 307/425 |
| 4,058,486 | 11/1977 | Mallozzi et al. | 372/5 |
| 4,075,505 | 2/1978 | Young | 307/425 |
| 4,135,091 | 1/1979 | Lanza et al. | 250/336.1 |
| 4,136,281 | 1/1979 | Murray | 250/336.1 |
| 4,147,995 | 4/1979 | Leiby, Jr. | 372/86 |
| 4,149,075 | 4/1979 | Drukier et al. | 250/336.1 |
| 4,218,628 | 8/1980 | Harris | 307/426 |
| 4,228,407 | 10/1980 | Ali et al. | 372/73 |
| 4,229,708 | 10/1980 | Mani et al. | 372/5 |
| 4,239,968 | 12/1980 | Kotera et al. | 250/327.2 |
| 4,258,334 | 3/1981 | McCusker et al. | 372/74 |
| 4,302,672 | 11/1981 | Kato et al. | 250/327.2 |
| 4,320,296 | 3/1982 | Ishida et al. | 250/327.2 |
| 4,328,443 | 5/1982 | Zappa | 372/74 |
| 4,346,295 | 8/1982 | Tanaka et al. | 250/327.2 |
| 4,350,893 | 9/1982 | Takahashi et al. | 250/484.1 |
| 4,356,398 | 10/1982 | Komaki et al. | 250/327.2 |
| 4,504,949 | 3/1985 | White | 372/3 |

*Primary Examiner*—James W. Davie
*Attorney, Agent, or Firm*—Ostrolenk, Faber, Gerb & Soffen

[57] ABSTRACT

A pre-excited excimer laser is formed in a thin flat package. Input X-ray photons which are modulated by passing through a body to be analyzed raise the pre-excited excimer gas molecules to a lasing energy level and the coherent radiation produced is measured and produces an amplified image of the input X-ray photon modulation.

20 Claims, 6 Drawing Figures

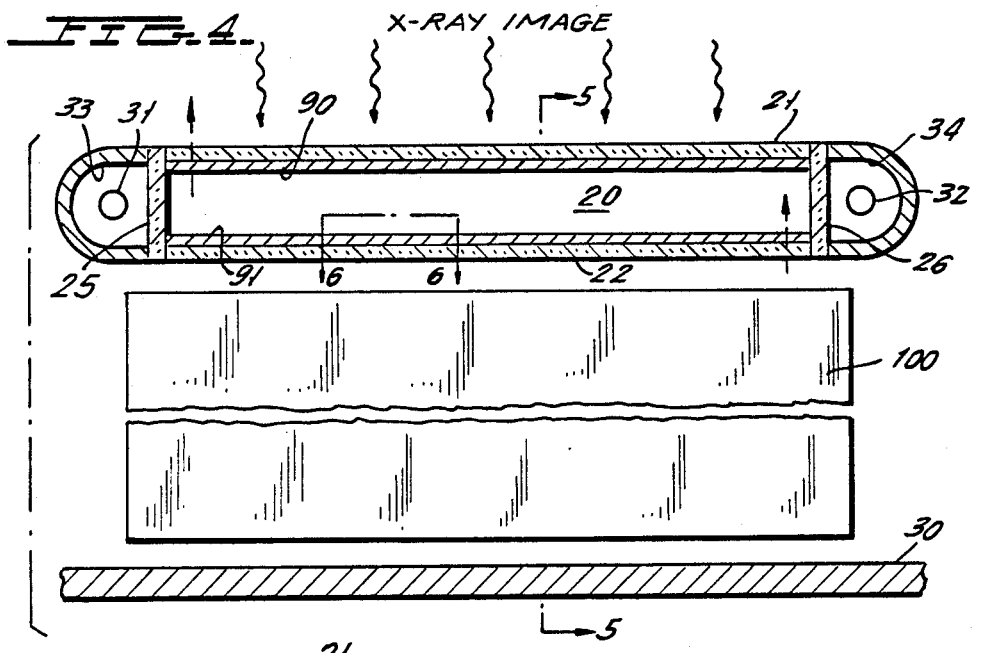
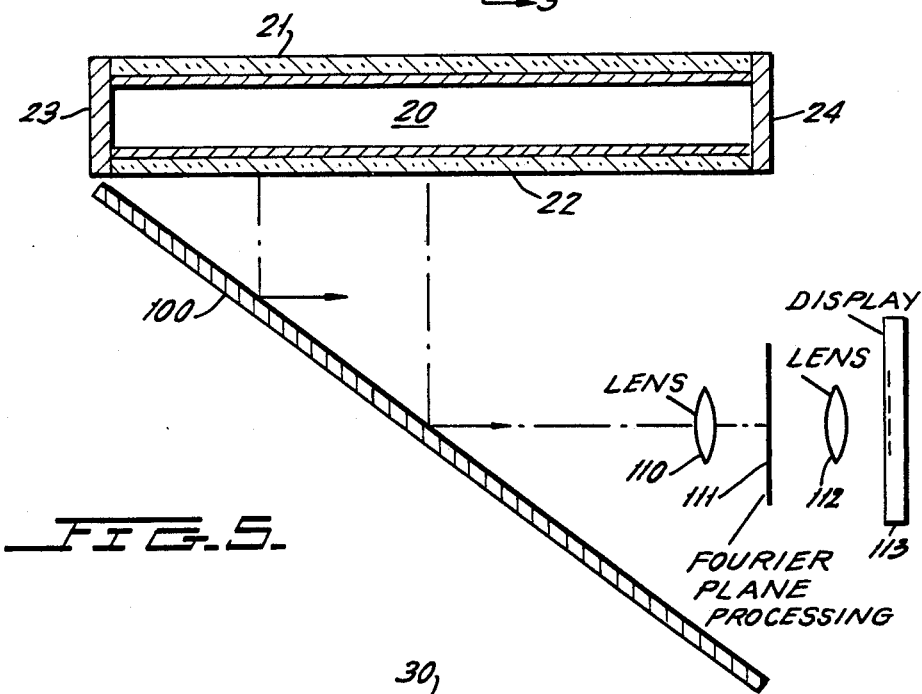
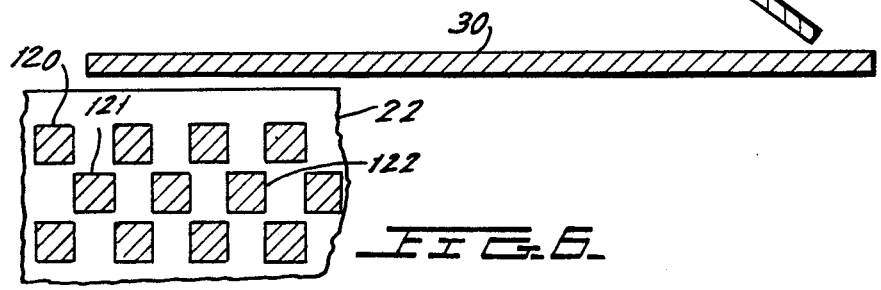

X-RAY FREQUENCY DOWN CONVERTER

This is a continuation of application Ser. No. 518,689, filed July 23, 1983, now abandoned.

BACKGROUND OF THE INVENTION

This invention relates to a novel X-ray detector and more specifically relates to a novel wide area X-ray detector for providing the amplified optical image of an X-ray image.

X-ray detectors are well known and are generally divided into two categories: scintillographic devices or charge transfer devices.

Scintillographic devices, such as X-ray image intensifiers are well known and are the basic devices in use in most hospitals. The operation of the conventional X-ray image intensifier involves multiple energy level transitions, coupled with a sophisticated electronic lens accelerator to provide high gain. The primary limitations of this device revolve around the necesary trade-offs that relate to the quantum detection efficiency of the scintillator, the spatial resolution, the contrast detectability and the system modulation transfer function (MTF).

Charge transfer devices commonly use the principle that energetic X-ray photons will deposit their charge directly onto a detector structure where the charge is directly accessible as an electrical signal. Charge transfer devices are more difficult to fabricate than scintillographic detectors, but offer significantly higher gain, spatial resolution and contrast detectability. The detector structures consist, for example, of an array of PN junctions in a semiconductor substrate with appropriate physical characteristics for the frequency band to be detected.

The present invention provides a novel X-ray detector which offers the general simplicity of X-ray image intensifiers and the high gain resolution and contrast which is available with charge transfer type devices.

BRIEF DESCRIPTION OF THE INVENTION

The present invention provides a novel category of X-ray detector which employs an excimer laser as the detector. While the excimer laser detector can have several geometries, this device is capable of fabrication into a relatively thin, flat package, for example 14 by 17 inches in area and approximately one inch thick, so that the device can fit and mount into existing Buckys and cassette holders such as those currently installed in X-ray systems throughout the world.

In the X-ray detector of the invention employing the excimer laser, the gas mixture is pumped or biased to an energy level just below the lasing energy level. This pumping can be obtained, for example, by a UV or microwave pumping source. Other pumping sources can be used. If an X-ray photon is then applied to the preexcited gas molecules, it will raise the local energy level above the lasting threshold and will cause the local release of coherent optical radiation in amounts proportional to the incoming X-ray photon energy level. Consequently, when an X-ray image is applied over the area of the excimer laser, there will be produced local coherent light output modulated in accordance with the intensity of the input X-ray photons, thereby enabling production of an optical output patten of the input X-ray photons but greatly magnified in intensity. The input X-ray source can have any desired form and can for example be the two-dimensional image of X-rays modulated by passing through a three-dimensional body; a pulsed pencil beam of X-rays which are scanned in raster-fashion across the body to be analyzed; or a fan-shaped beam of X-rays which is scanned perpendicular to the fan length across the body to be analyzed.

The output photons produced by the lasing excimer gas can be suitably detected in various manners. In a first embodiment of the invention, the laser output is detected by a semiconductor photodetector which is operated synchronously with the input X-ray source to produce an output having two-dimensional information. In a second embodiment, a direct optical readout is derived from the excimer laser.

To encourage local excitation of the excimer gas, the laser cavity may be a flat, thin cavity in which cavity sections are isolated from one another by parallel ridges. These ridges and the housing itself are preferably of materials transparent to the pumping radiation and to the input X-rays and form localized cells to limit the spreading of gas excitation above the lasing threashold by input photons. While the preferred embodiment of the invention employs an input X-ray source, any type of input radiation can be used including photon or particle inputs having an energy in excess of about 5 kev. All such inputs are hereinafter referred to as X-rays.

BRIEF DESCRIPTION OF THE DRAWINGS

FIG. 4 is a cross-sectional view of a further embodiment of the invention in which the optical image of the X-ray image is directly and visually observed in two dimensions.

FIG. 5 is a cross-sectional view of FIG. 4 taken across the section line 5—5 in FIG. 4 and further schematically illustrates processing optics which can be used to operate on the image which is produced.

FIG. 6 is a view of the partial reflecting mirror in the laser of FIG. 4, wherein the reflecting areas consist of isolated islands.

DETAILED DESCRIPTION OF THE DRAWINGS

Figure 2:
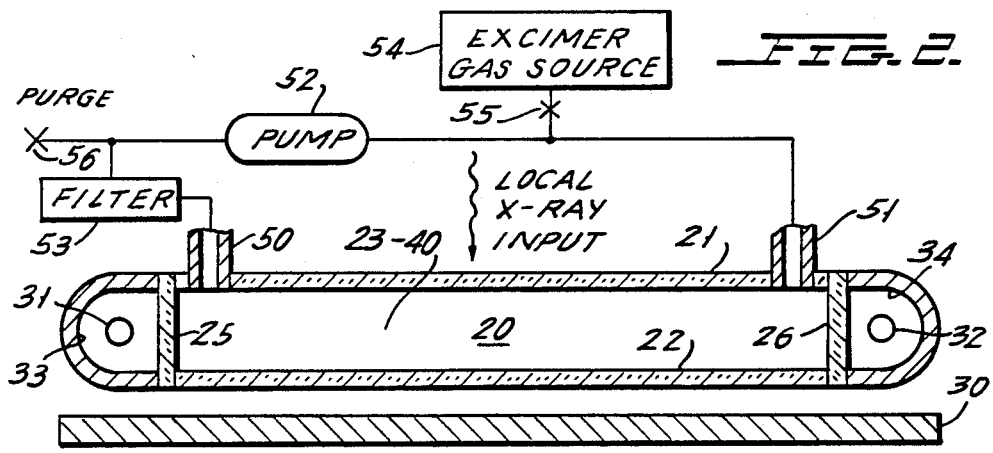
FIG. 2 is a cross-sectional view of FIG. 1, taken across the section line 2—2 in FIG. 1.
Figure 1:
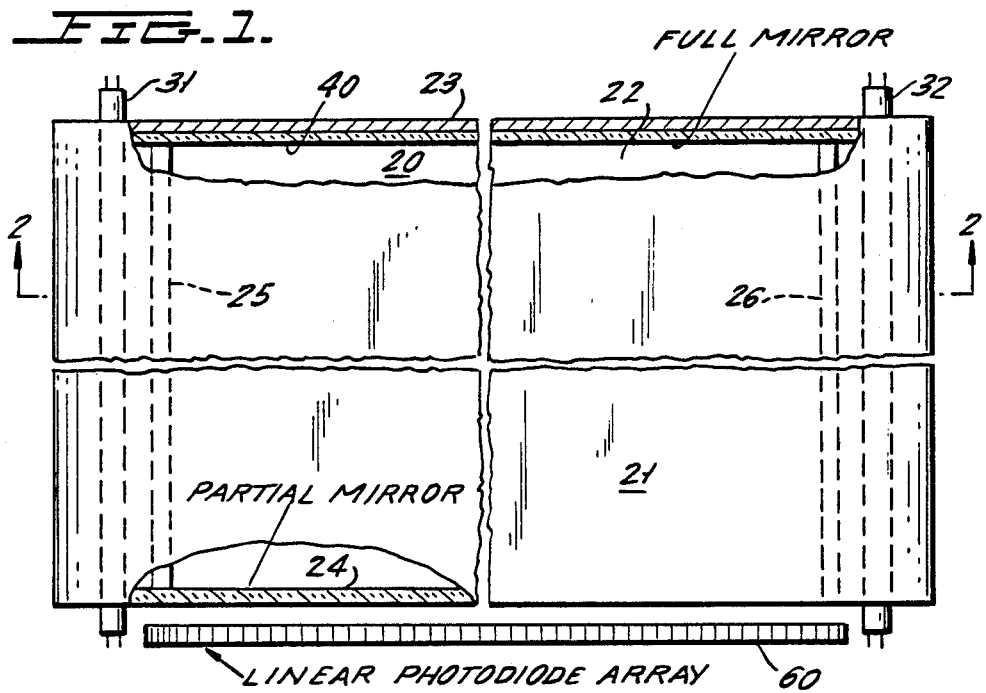
FIG. 1 is a top view partially in cross-section of a large area X-ray detector constructed in accordance with the invention.

Referring first to FIGS. 1 and 2, there is shown therein a flat, relatively thin excimer laser structure. The laser structure consists of a flat, thin cavity 20 defined between top wall 21 and bottom wall 22. The top and bottom walls 21 and 22 are joined at their ends by end walls 23 and 24 and at their sides by side walls 25 and 26. Top and bottom walls 21 and 22 in the embodiment of FIGS. 1 and 2 may be of any desired material, particularly one which is transparent to X-ray photon input from an X-ray source. A thick lead plate 30 may be disposed beneath the bottom wall 22 to serve as a shield to the X-ray input radiation which passes through the cavity 20.

Adjacent the side walls 25 and 26 are two ultraviolet lamps 31 and 32 which serve as laser pumping sources as will be later described. Each of the lamps 31 and 32 is contained at the focal point of respective parabolic reflectors 33 and 34, respectively, which direct the ultraviolet pumping radiation inwardly through walls 25 and 26 and into the cavity 20. The material selected for walls 25 and 26 may be quartz and is transparent to ultraviolet radiation or to any other pumping energy which is employed. Note that the walls 25 and 26 can be removed and the parabolic reflectors 33 and 34 can act directly as the side walls of the chamber 20.

In order to make the cavity 20 a laser cavity, end wall 23 receives a full mirror 40 or a full mirrored surface, if desired, while the opposite end wall 24 consists of a partial mirror surface. Note that the mirrors can be located outside of the cavity 20, if desired. The interior of the cavity 20 is then filled with a suitable excimer gas consisting of any desired combination of a suitable nobel gas and halogen under positive pressure. Typically, xenon fluoride can be used at a pressure up to about 10 atmospheres. As high a pressure as can be used is desirable, although this pressure will be limited by the structural strength of the containing vessel. Other excimer gases such as xenon chloride and argon chloride could also be used.

Excimer lasers are well known and are capable of being pumped with ultraviolet radiation, microwave, x-rays or the like. Moreover, the gas of the excimer laser can be pumped to an energy just below its lasing energy, so that the addition of a relatively low energy photon can be sufficient to raise the energy level of local molecules to a high enough value to go into a lasing mode of operation.

The cavity size which is used in accordance with the invention is approximately 14"×17"×1" in thickness. This size is chosen since it conforms to the size commonly used for existing X-ray cassettes so that the novel X-ray detector of the invention can be directly employed in existing X-ray apparatus.

As is further shown in FIG. 2, the cavity 20 is provided with inlet and outlet conduits 50 and 51, respectively. A suitable gas pump 52 then pumps the excimer gas mixture from chamber 20 through a filter 53 to remove by-products formed in the gas each laser event. Filter 53 can, for example, be any desired molecular sieve. A source of excimer gas 54 is connected to the system through a valve 55 to add gas as desired. A purge valve 56 is also provided to purge existing gas from the system when desired.

The laser output surface consisting of the partially mirrored output surface 24 faces a linear semiconductor photodiode array 60. The linear photodiode array 60 will have suitable electrical outputs (not shown) which can be synchronized with a raster-scanned, pulsed, thin pencil beam of X-ray photons. This beam scans the body to be examined with a raster-type scan and the output of the linear photodiode array, appropriately synchronized with the raster scan can be used to electronically construct a two-dimensional image of the modulation of the X-ray pencil beam by the body being examined.

The pencil beam can be replaced, if desired, by a fan-shaped array of X-ray energy which can have a width equal to the distance between walls 23 and 24 and scans perpendicularly to these walls in a single sweep.

In operation, and assuming that a pencil beam of X-rays is swept through the cavity 20 with a raster-like scan, all of the excimer gas within cavity 20 is initially pumped to just below laser excitation energy by the pumping lamps 31 and 32. Incoming X-ray photons will have sufficient energy to raise the local gas atoms to a lasing energy level. The lasing output radiation applied to the photodiode array 60 at any instant is proportional to the X-ray photon intensity reaching the detector at that instant. Conventional computer techniques then make it possible to reconstruct a two-dimensional image of the X-ray intensity distribution as the X-ray beam scans through the body being analyzed.

Figure 3:
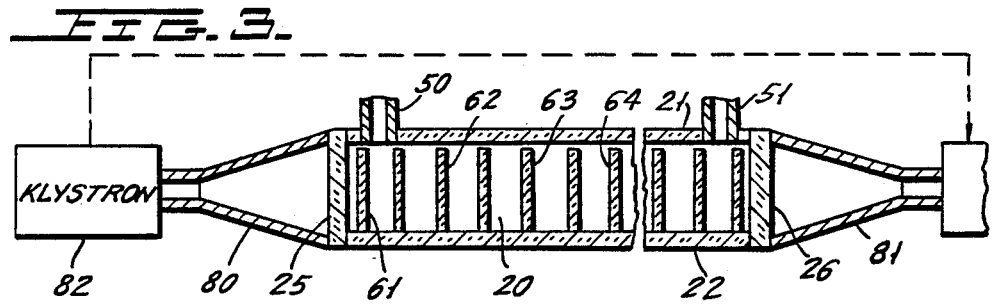
FIG. 3 is a cross-sectional view similar to FIG. 2 but shows the use of ridges within the lasing volume and a microwave pumping source in place of the ultraviolet lamp pumping source of FIG. 2.

FIG. 3 shows a second embodiment of the invention wherein components similar to those of FIGS. 1 and 2 have been given similar identifying numerals. Thus, there is provided the basic cavity 20 which, in FIG. 3, contains elongated spaced, parallel baffle plates 61 to 64 extending from the lower plate 22, the ends of which are spaced from the upper wall 21 to permit circulation of gas within the cavity 20. The plates 61, 62, 63 and 64 form parallel optical channels within the cavity 20 which lead directly to individual elements of the photodiode array 60 of FIG. 1.

The baffles of FIG. 3 are made of a material which is transparent to the pumping radiation and which has good mechanical strength. Fiberglass can be used to advantage with microwave pumping.

FIG. 3 also shows a modified pumping source in which the UV pumping lamps of FIGS. 1 and 2 are replaced by microwave sources. Thus, as shown in FIG. 3, two wave guides 80 and 81 extend from side walls 25 and 26 rspectively and receive inputs from klystron 82. Note that two separate klystrons can be used for wave guides 80 and 81, respectively. Klystron 82 is operated at an appropriate frequency. Any other microwave generator such as a magnetron or the like can be used in place of klystron 82.

In the embodiment of FIG. 3, the side walls 25 and 26 and the baffles, such as baffles 61 and 70, should be of a material transparent to the microwave frequency and can, for example, be a lead bearing glass or a ceramic with a glass overcoat. Both structural strength and transparency to the pumping radiation are considerations for the design of the housing components.

All other components of the excimer laser structure of FIG. 3 will be identical to those of FIGS. 1 and 2, the only difference being the use of a different pumping source and the use of the baffling within cavity 20. Laser radiation output detection still occurs at output photodiode array 60 or the like.

As an example of the present invention in this embodiment, the microwave source for pumping the excimer gas mixture could be a Varian SFD-303 coaxial magnetron and a line-type pulser, a radar pulser or any similar commercially available microwave switch to provide 2-$\mu$s-long pulses at 9.375 GHz, corresponding to a wavelength of approximately 3 cm. If XeCl was chosen as the excimer gas mixture, the optimum gas mixture would comprise 0.3% Xe, 0.05% HCl, and 99.6% Ne (the carrier gas) at a total pressure of two atmospheres.

In accordance with the invention, the microwave energy is coupled to the cavity (20) by waveguides 80 and 81 as shown in FIG. 3. The magnetron power is set at about 600 kW per pulse, a level just below the lasing energy level, such that the impinging x-rays will raise the energy level above the lasing threshold and will cause the local release of coherant optical radiation in amounts proportional to the incoming x-ray photon energy level.

In another embodiment of the invention, not shown, the linear photodiode array 60 can be replaced by direct optical lens means which can form an integrated optical image on a screen or on a photographic film with appropriate scanning of the partial mirror surface 24 taking place in synchronism with the vertical scan rate of the scanning pencil beam of the X-ray input. Conventional optical processing techniques can be used with the optics.

Still another embodiment of the invention is shown in FIGS. 4 and 5, wherein a full optical image of the X-ray source is presented over the full area of the bottom of the cavity 20. Thus, in FIGS. 4 and 5, the laser structure is modified from that of the preceding figures, in that the laser mirrors consist of a full mirror 90 extending over the full inside surface of upper wall 21 and the partial mirror 91 extending over the inside surface of the lower wall 22. Ultraviolet pumping lamps 32 and 33 are provided as in the case of FIGS. 1 and 2, although microwave pumping could also be used.

In the arrangement of FIGS. 4 and 5, it will be apparent that the output laser beam from the partially silvered mirror 91 will exit through the wall 22 which will be of glass or some other material suitably transparent to the output laser radiation. A full two-dimensional X-ray image can then be applied to the cavity 20 and local lasing intensity which is proportional to the X-ray intensity at the local area will be produced as an optical image over the full surface of the bottom wall 22. This optical image can be safely viewed by using a reflecting mirror 100. Mirror 100 can also direct the image toward and into optical processing elements, while still permitting room for the lead sheath 30 which serves to contain the X-rays which produce the image.

Typical optical processing equipment is schematically shown in FIG. 5 and consists of a focusing lens 110 which focuses the light reflected from the surface 100 toward a fourier plane 111 which can contain appropriate fourier processing components. The processed image is then collimated by the lens 112 and is applied to a suitable display 113. Other optical processing equipment can be used and any desired display can be used. Thus, the overall system is a fully optical system which will have a very high overall modulation transfer function.

In the embodiment of FIGS. 4 and 5, the cavity 20 is shown free of baffles. It will be apparent that the cavity can employ baffles, such as baffles 61, 62 and 63 of FIG. 3, in order to segregate small areas of the chamber from one another. If desired, an "egg crate" type baffling can be employed to separate the area into a plurality of individual cells.

A further embodiment of the arrangement of FIGS. 4 and 5 is illustrated in FIG. 6 where the partial mirror 91 on wall 22 consists of individually spaced partial mirror sections such as sections 120, 121 and 122 which will define a plurality of individual and isolated laser elements distributed over the full area of the bottom wall 22. The full mirror 90 on the top wall 20 can be similarly segregated to define full mirrored sections in registry with the half mirrored sections 120, 121 and 122.

In carrying out the invention in any of the embodiments disclosed, it will be noted that any desired excimer gas mixture can be employed in order to produce a coherent output at an appropriate frequency. Thus, the gas mixture can be selected for compatibility with particular films or photodetectors which are used. The selection of gas mixtures will vary the quantum detection efficiency of the system.

Where the invention is implemented with a full optical version, such as that of FIGS. 4 and 5, the power level of the laser may be adjusted upwardly to compensate for losses in the processor and in film sensitivity.

While the preferred form of the cavity is a flat, thin cavity to be consistent with existing X-ray cassette design, it will be apparent that other cavity shapes can be used. Thus, the cavity can be appropriately shaped to satisfy the configuration of a particular image processor or input radiation source.

While the system has been described herein for use with the processing of X-ray images and making such images visually observable, the invention is more broadly applicable to the transformation of a non-coherent source at one frequency to a coherent source at another. The entire detector structure may be packaged in a suitably lead shielded enclosure in accordance with standard practice.

The pumping sources disclosed have a relatively fixed intensity. However, the amount of pre-ionization produced by the pumping sources can be adjustable in order to control the overall sensitivity of the device. Moreover, the pump cavity and reflectors may be water cooled, if necessary. The optical processing components can also include temporary buffering components such as liquid crystal storage cells, if desired. Moreover, the excimer laser disclosed can be used to pump a dye laser in order to directly produce a visible light output.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. An X-ray detector comprising an excimer laser consisting of a cavity filled with a mixture of a noble gas and a halogen gas; said cavity having first and second parallel spaced walls which have a respective fully reflecting and partially refecting member fixed thereto; laser pumping means coupled to said cavity for pre-exciting said excimer gas within said cavity to a level first below its lasing energy level, whereby an input X-ray photon of given energy will induce local coherent light generation of a corresponding intensity within said cavity and exteriorly thereof through said partially reflecting member; an input source of X-ray photons fixed relative to said cavity and separate from said pumping means; and an output detector for detecting coherent light generated by said input source of X-ray photons.

2. The X-ray detector of claim 1, wherein said source of X-ray photons applies X-ray photons over the full surface of one wall of said cavity and wherein said output detector is coextensive with said partially reflecting member.

3. The X-ray detector of claim 1, wherein said cavity has a thickness which is small compared to its length and width.

4. The X-ray detector of claim 1, wherein said detector has a length of about 14 inches, a width of about 17 inches and a thickness of about 1 inch.

5. The X-ray detector of claim 3, wherein said laser pumping means includes first and second pumping sources are disposed adjacent opposite edges of said cavity and extend along the width of said cavity.

6. The X-ray detector of claim 5, wherein said first and second pumping sources comprise respective ultraviolet light lamps.

7. The X-ray detector of claim 5, wherein said first and second pumping sources comprise respective microwave energy sources.

8. The X-ray detector of claim 7, wherein said source of X-ray photons applies X-ray photons over the full surface of one wall of said cavity and wherein said output detector is coextensive with said partially reflecting member.

9. The X-ray detector of claim 1, 3, 4 or 5, wherein said input source of X-ray photons consists of a narrow beam of X-ray photons and raster scan means for sweeping said beam over said cavity with a raster scan.

10. The X-ray detector of claim 9, wherein said output detector consists of a linear semiconductor photodiode array disposed exteriorly of said cavity and along the length of said partially reflecting member.

11. The X-ray detector of claim 1, 3, 4 or 5, wherein said input source of X-ray photons consists of a fan-shaped beam of X-ray photons, and means for sweeping said beam over the length of said cavity.

12. The X-ray detector of claim 11, wherein said output detector consists of a linear photodiode array disposed exteriorly of said cavity and along the length of said partially reflecting member.

13. The X-ray detector of claim 1 which includes pump means connected to said cavity, and filter means; said pump means being connected to circulate said excimer gas in said cavity through said filter.

14. The X-ray detector of claim 3, wherein said fully reflecting and partially reflecting members are disposed on respective ones of the opposite large area surfaces of said cavity; said X-ray photon source being disposed adjacent said fully reflecting surface.

15. The X-ray detector of claim 1 which further includes baffle means disposed in said cavity for subdividing said cavity into a plurality of mutually isolated gas filled volumes, each of which is continuous between said fully and partially reflecting members; said baffle means being of a material which is transparent to the radiation of said laser pumping means.

16. The X-ray detector of claim 14, wherein said partially reflecting member consists of a plurality of discontinuous regions.

17. The process of converting X-ray energy to a lower frequency radiation; said process comprising the steps of pre-exciting the molecules of an excimer gas mixture in a laser cavity to an energy level just below the lasing energy level; applying X-ray photons to be converted to lower frequency radiation to said excimer gas mixture in order to raise the energy level of molecules in the path of said X-ray photons to a lasing energy level at which they produce output radiation having a lower frequency than said X-ray photons and an intensity related to the energy of the exciting X-ray photon; and detecting the local coherent radiation produced by said pre-excited lasing gas molecules.

18. The process of claim 17, wherein said X-ray photons consist of a narrow beam of X-ray photons which are scanned in a raster-like scan through an object to be analyzed and over an input surface of said cavity.

19. The process of claim 17, wherein said X-ray photons consist of a fan of X-ray photons which are scanned through an object to be analyzed and over the length of said cavity.

20. The process of claim 17, wherein said X-ray photons extend over a two-dimensional area and have been modulated by passing through a three-dimensional object being analyzed and wherein said x-ray photons are simultaneously applied over a full input surface of said cavity.

* * * * *